Patented Dec. 21, 1943

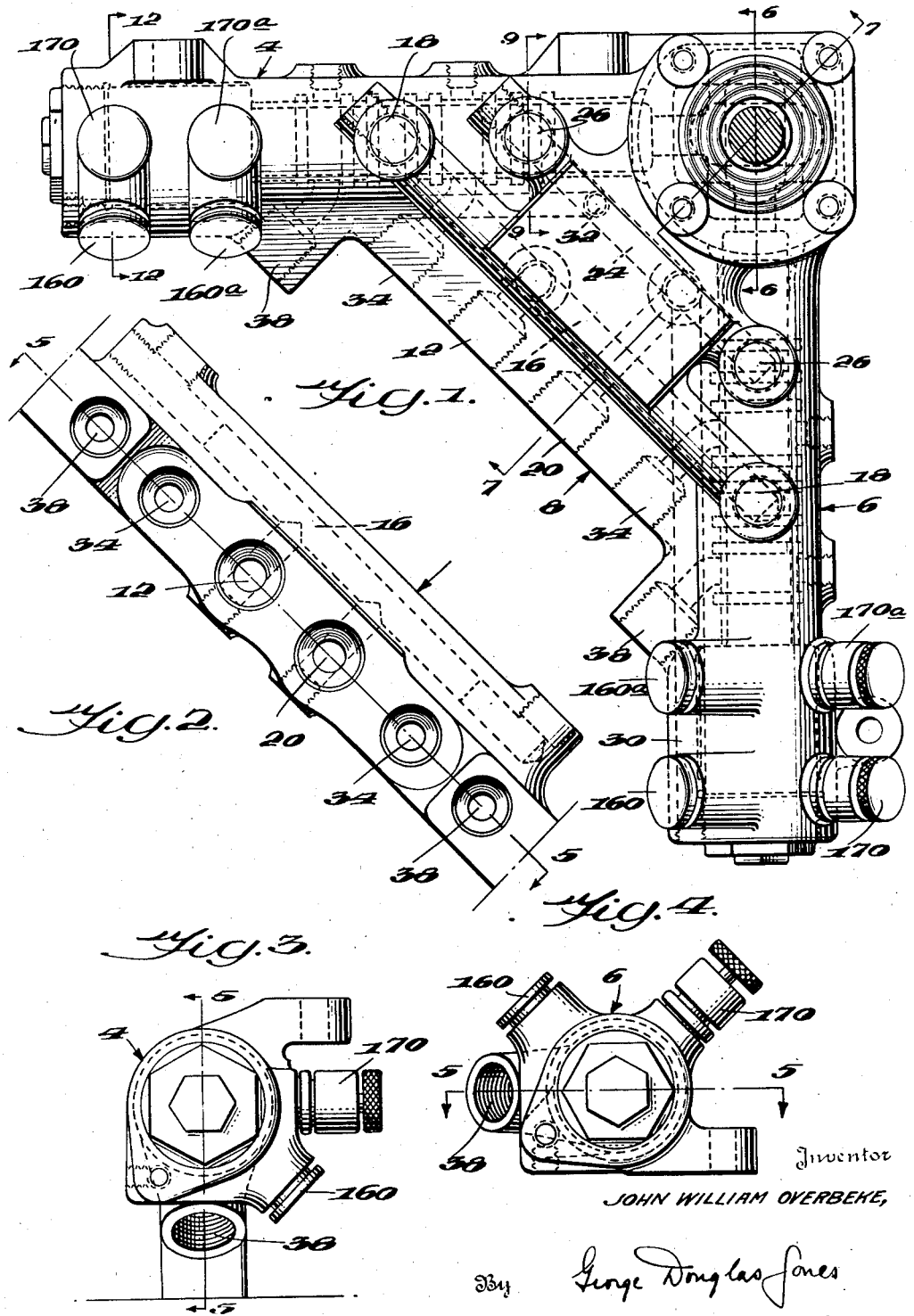

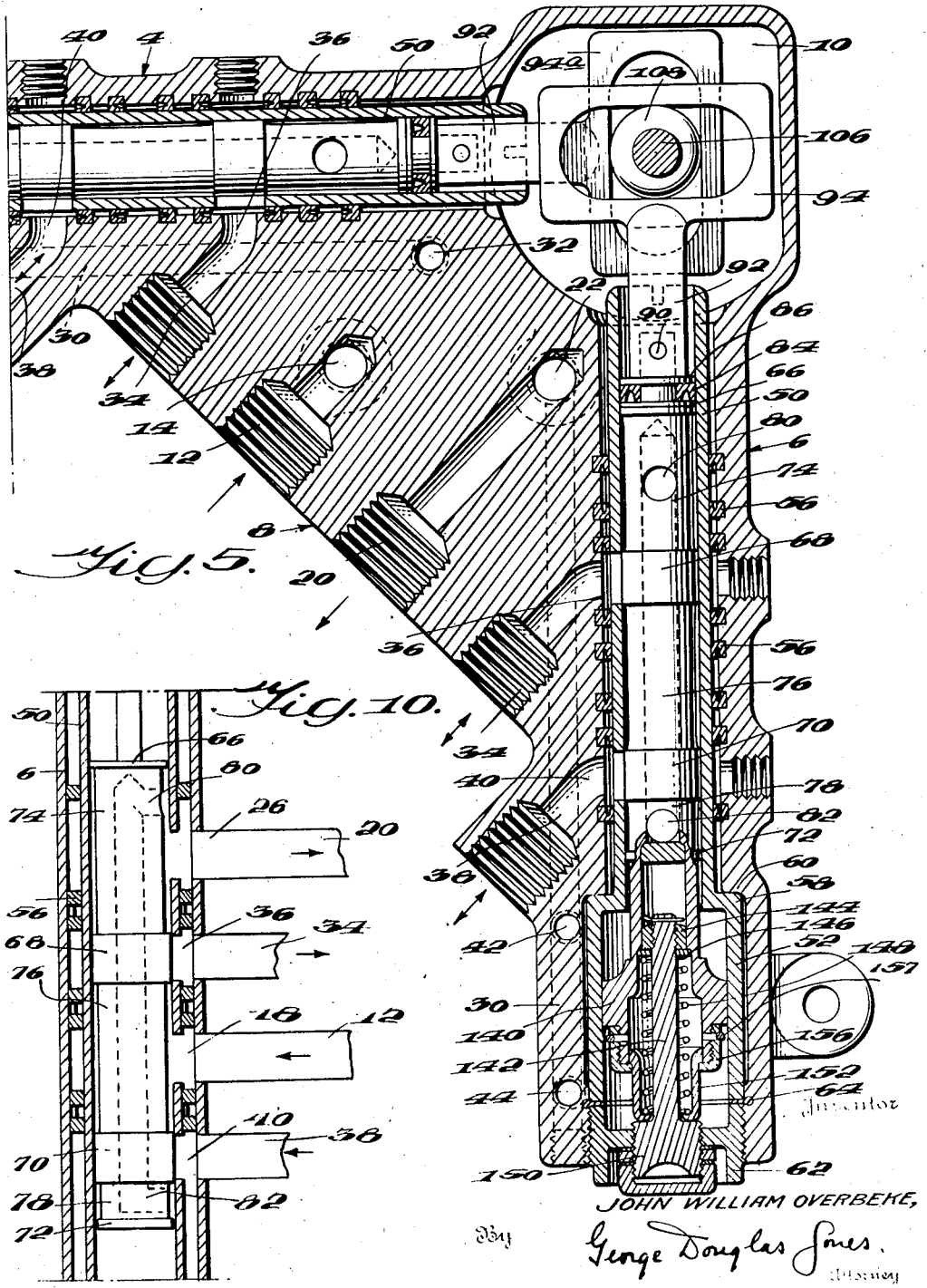

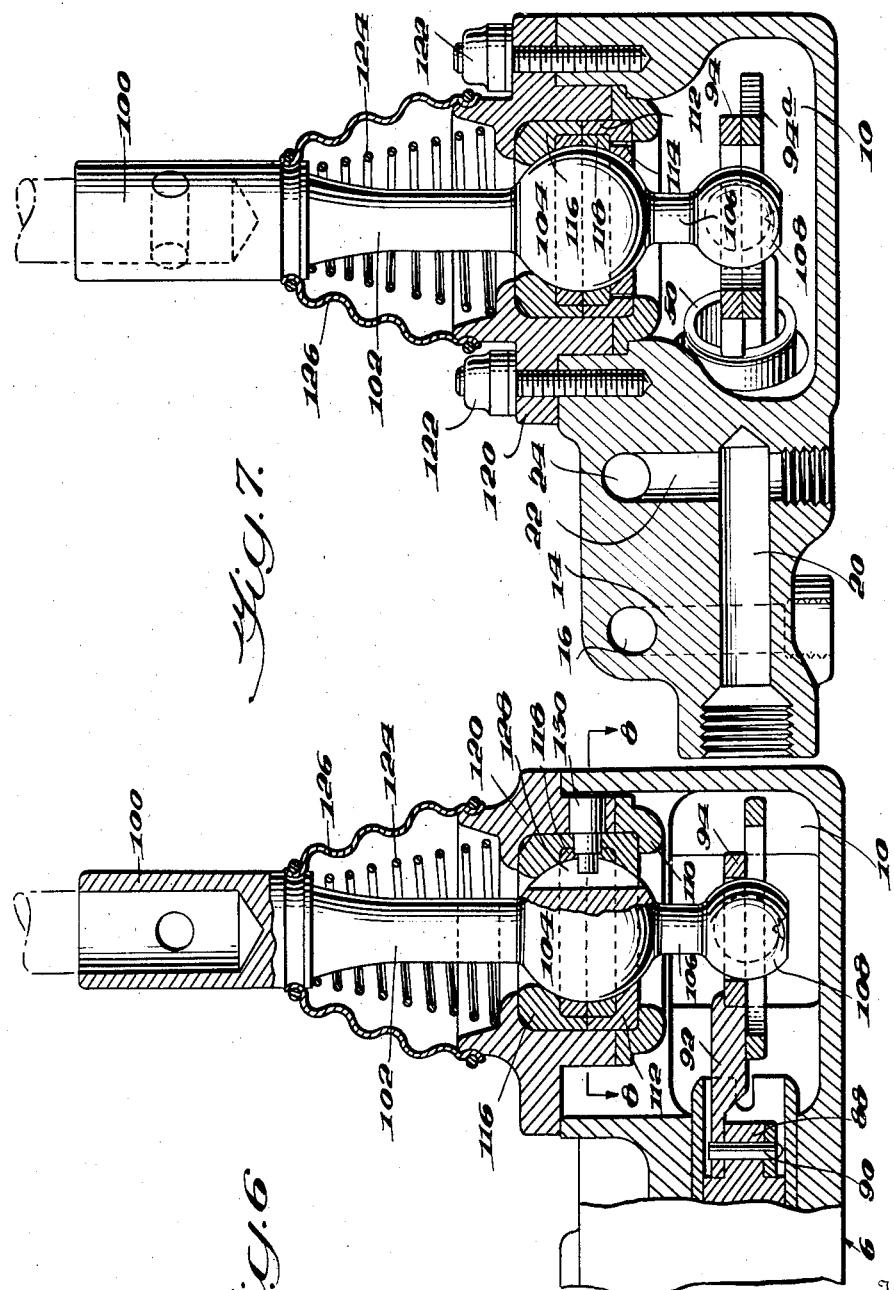

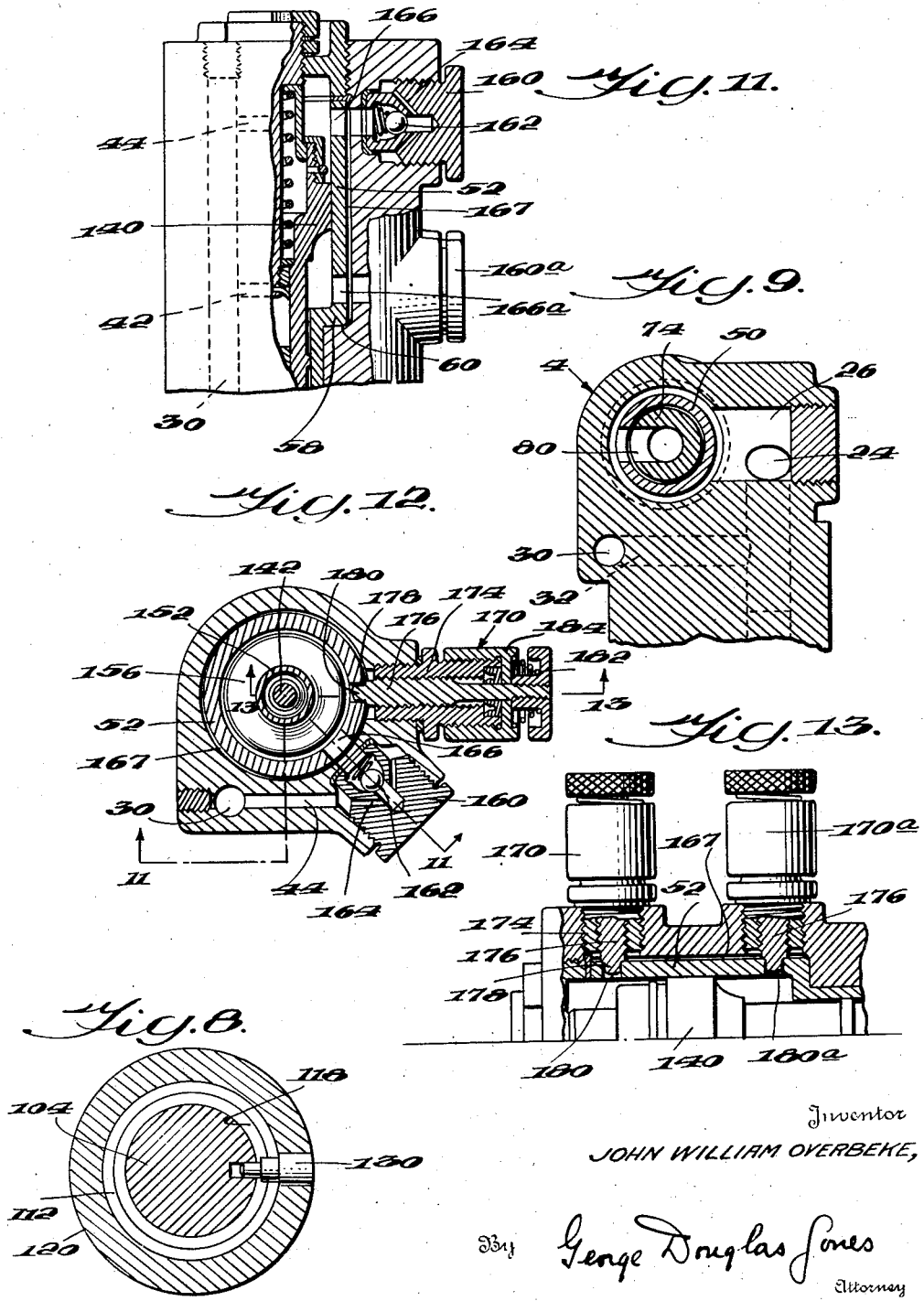

2,337,166

UNITED STATES PATENT OFFICE 2,337,166

CONTROL VALVE

John W. Overbeke, Anneslie, Md., assignor to The Glenn L. Martin Company, Middle River, Md., a corporation of Maryland Application December 13, 1941, Serial No. 422,799

5 Claims. (Cl. 137—144)

This invention is directed to a control valve. In particular the invention is directed to the construction of a valve operable by a control stick for actuating a pair of hydraulic motors either individually or both at the same time.

In aircraft it is often necessary to operate pairs of motors so that either motor can be individually set in motion, or both motors can be run at the same time. For example, one motor may be used to move a gun turret horizontally, while a second motor may be used to elevate the gun turret. In order to set the gun turret in the proper direction the motors must be actuated both independently of each other when desired, or both actuated at the same time. It is desirable to have a single control for the motors such that the movement of this control in a predetermined direction will give the desired operation of the motors.

It is an object of the invention to construct a valve operable by a single control member for actuating a pair of hydraulic motors either singly or together.

Another object of the invention is to construct a control valve actuatable by a single control member which is substantially similar to the conventional joy stick used in manipulating the controls of an aircraft.

Another object of the invention is to construct a control valve which is of light weight compact construction, and which serves as the base for a control stick.

Another object of the invention is to construct a control valve which is actuated by a single control stick, and gives a sense of smooth positive "feel" of control when manually moving the stick to operate the motor valve, and prevents erratic over-control of the valve.

Another object of the invention is to produce a control valve of the type described which is adjustable to regulate the "feel" of control during the operation of the valve.

Another object of the invention is to produce a control valve for operating a plurality of motors in which the valve automatically resumes, after each operation, a normal centered position.

Generally these objects of the invention are obtained by construction a valve block in which two piston valves are mounted at right angles to each other. At the intersection of the axes of these pistons a control stick is mounted and joined to each of the piston valves by links so that one piston valve may be moved by the stick independently of the other, or both piston valves may be operated simultaneously by the stick, all depending upon the direction the control stick is moved. At the outer ends of the piston valves, dashpots are located to prevent the piston valves from being too freely movable in their respective cylinders and thus preventing over-control of the valves. Exteriorly adjustable needle valves are provided for the dashpots so that their action can be regulated to give a sense of "feel" to the control stick. This adjustment may be made during the operation of the stick. Spring means are also provided to center the piston valves in their cylinders so that normally the valve will remain in centered motor cut-off position.

The means by which the objects of the invention are obtained are more fully described with reference to the accompanying drawings in which:

Fig. 1 is a plan view of the valve;

Fig. 2 is a partial side elevational view of the valve showing the center portion thereof;

Fig. 3 is an end view of the upper side of the valve in Fig. 1;

Fig. 4 is an end view of the lower side of the valve in Fig. 1;

Fig. 5 is a cross-sectional view through the valve along the line 5—5 of Figs. 2, 3 and 4;

Fig. 6 is a cross-sectional view on the line 6—6, Fig. 1;

Fig. 7 is a cross-sectional view along the line 7—7, Fig. 1;

Fig. 8 is a cross-sectional view in the plane indicated by the line 8—8, Fig. 6;

Fig. 9 is a cross-sectional view on the line 9—9, Fig. 1;

Fig. 10 is a diagrammatic view illustrating the fluid flow through the valve cylinder;

Fig. 11 is a partial longitudinal cross-sectional view through a dashpot as shown by the line 11—11, Fig. 12;

Fig. 12 is a cross-sectional view on the line 12—12, Fig. 1; and

Fig. 13 is a longitudial view through the adjusting mechanism for the dashpot.

As shown in Figs. 1 to 5, the valve is composed of an L-shaped block having legs 4 and 6 between which lies a fillet 8. Legs 4 and 6 are substantially similar and therefore the description of one will suffice for the both of them. Leg 6, a full cross-sectional view of which is shown in Fig. 5, will be described in detail, although reference will be made to cross-sectional views Figs. 9 and 12 taken on leg 4 as the details are similar for leg 6.

Each leg of the valve block is bored to form a cylinder extending longitudinally therethrough, this cylinder being of wide diameter adjacent the end of the leg and of less diameter in the remainder of the leg. At the intersection of the axes of these cylinders, the block is hollowed to form a chamber 10. Fillet 8 is provided with a horizontal pressure inlet bore 12 which connects through a vertical bore 14 to a horizontal bore 16, note Fig. 7. Bore 16 extends horizontally across fillet 8 to each of the legs 4 and 6, and terminates in a port 18 into each of the cylinder bores in legs 4 and 6, respectively. Next to pressure inlet bore 12 is a horizontal pressure outlet bore 20 connecting by means of a vertical bore 22 with a horizontal bore 24, note Fig. 7, paralleling bore 16 and terminating in ports 26, note Figs. 1 and 9, in legs 4 and 6, respectively. In leg 6, a bore 30 extends longitudinally of the leg from vertical bore 22 to the end of the leg to serve as a pressure passage for the dashpots at the end of the leg. A similar bore 30 exists in leg 4 and is connected to bore 24 by means of a vertically extending bore 32, Fig. 5. Fillet 8 is further provided with two bores 34, one for each of the legs 4 and 6, which terminate in a port 36, Fig. 5, in the cylinder of each leg, which bores function as pressure supply and return passageways to be connected to the motors. Immediately adjacent bores 34 in fillet 8 are bores 38 forming second pressure and return conduits, each terminating in a port 40 in the cylinder. To serve the dashpots at the ends of the cylinder, each leg is provided with vertical bores 42 and 44 communicating with horizontally extending bores 30 for a purpose to be later described.

Mounted in the cylinder within each of the legs 4 and 6 is a cylinder liner which consists of a narrow portion 50 of less diameter than the narrow portion of the cylinder, and a wide portion 52 of less diameter than the wide portion of the cylinder but of greater diameter than the narrow cylinder portion. Liner portion 50 is provided with ports corresponding to ports 18, 26, 36 and 40 in the wall of the bore, and these ports are separated from each other by ring packings 56 which also serve to center the liner in the cylinder. The wide portion of the liner is joined to the narrow portion 50 by a shoulder 58 which abuts against a shoulder 60 in the bored leg 6. The liner is held in place within the bore by means of a threaded plug 62 separated from the end of the liner by gasket 64. The liner is thus easily removed for purposes of inspection, repair or for being replaced in order to change the size of the ports in the liner, as these ports may be metering ports of the type shown in my Patent No. 2,209,418, granted July 30, 1940.

Mounted within the narrow portion 50 of the liner is a piston which includes piston heads 66, 68, 70 and 72 spaced from each other by narrow neck portions 74, 76 and 78, respectively. The piston is also longitudinally bored which bore terminates in exit 80 in neck portion 74, and exit 82 in neck portion 78. The inner end of the piston is provided with a sealing packing 84 between piston head 66 and flange 86, with the piston terminating in a tongue 88, note Fig. 6. Connected to tongue 88 by pin 90 is an arm 92 terminating in a link 94 lying in chamber 10, the greatest axis of the link for leg 6 being perpendicular to the longitudinal axis of leg 6.

Leg 4 is of similar construction with the exception that the corresponding link 94a lies with its major axis perpendicular to the longitudinal axis of leg 4 and immediately beneath link 94.

The control stick mechanism for operating links 94 and 94a and their respective pistons is shown in detail in Figs. 5, 6 and 7. Socket 100 is adapted to receive the control stick and is connected to a shaft 102 to ball 104. On the lower side of ball 104, a neck 106 extends to a second ball 108. Ball 104 forms the pivot for the lever of which ball 108 forms one end. Mounted on a shoulder in the housing 10 is an annular lower knuckle insert 110 which supports the lower half 112 of a socket for the ball 104. This socket portion is provided with oil lubricating bores 114. The upper half 116 of the socket rests upon the lower socket 112, and the outer portions of these halves bear upon ball 104, while the center portion of the socket is filled with a wiper 118. The socket is held in place by an annulus 120 seated both upon knuckle insert 110 and the upper surface of the valve housing and is fastened in place by bolts 122 extending into the valve housing. A spring 124, between the lower end of socket 100 and annulus 120, provides a resilient means for holding the socket 100 in normal upright position. This spring is enclosed by a flexible protective cover 126.

Ball 104 has a vertical slot 128, note Figs. 6 and 8, into which a centering pin 130 projects to prevent ball 104 from rotating horizontally in the socket.

Ball 108 contacts both links 94 and 94a. As the diameter of ball 108 is substantially equal to the minor dimension of each of the links, it is apparent that when the ball is moved by the control stick in the direction of the minor opening in either link, that link will be moved, while when the ball is moved in the direction of the major dimension of the link, that link will not be moved until the ball has reached the end of the link. If the ball 108 is moved diagonally of either link, both links will be simultaneously moved.

At the ends of legs 4 and 6 dashpots are included for the purpose of giving a sense of "feel" of control to the movements of the piston valves from the control stick. In the large portion 52 of the liner the piston terminates in a dashpot piston head 140. This portion of the piston is hollowed, and mounted therein is an adjusting stem 142. The inner end of this stem has a nut 144 threaded thereto which holds in place a flat ring 146 bearing on a shoulder in the interior wall of the piston and forming an abutment for one end of a compression spring 148. The opposite end of stem 142 terminates in an adjusting screw head 150. The other end of spring 148 is held in place by a spring cap 152 which in turn is held in place by a retainer nut 156 threaded to the piston and locked in place by a snap ring 157.

Mounted on the leg and communicating with bores 42 and 44 are a pair of valves 160 and 160a. Each of these valves includes a spring pressed check valve 162, Figs. 11 and 12, communicating with bores 42 and 44, respectively, through passages 164 in the check valve, and with the interior of liner portion 52 through ports 166 and 166a, respectively. Ports 166 and 166a lie on opposite sides of piston head 140. As liner portion 52 is of less diameter than the adjacent cylinder portion, a space 167 exists therebetween.

A second set of valves 170 and 170a, functioning as adjustable metering valves, are also mounted on the cylinder and communicate with the interior of the cylinder on opposite sides of piston head 140. Each of these valves, note Figs. 12 and 13, consists of a body 174 threaded into the cylinder and supporting an adjustable threaded stem 176 terminating at one end in a needle point 178 lying in a port 180 in cylinder portion 52. Adjusting screw 176 at its outer end terminates in an adjusting screw nut 182 held in place by a screw cap 184 threaded to body 174.

The operation of this device is as follows:

Bore 12 is connected to a source of pressure as a hydraulic pump, while bore 20 is connected to a return line to the pump. Bores 34 and 38 in leg 4 are connected to one hydraulic motor, while bores 34 and 38 in leg 6 are connected to a second hydraulic motor. One of the motors is to be operated for the purpose of, for example, turning a gun turret on its horizontal axis, while the second motor is for the purpose of turning the gun turret on its vertical axis.

In the operation of one of the motors, for example, the motor connected to leg 6, the stick connected to socket 100, is moved clockwise in Fig. 6. This then causes ball 108 to push link 94 and thus shove the piston downwardly in Fig. 5 so that piston head 68 uncovers port 36. Likewise piston head 70 uncovers port 40. At the same time the pressure inlet port 18, note Fig. 1, and the pressure outlet port 26 remain opened. Inasmuch as these ports are in different planes and cannot be well shown in any one figure, reference is made to the diagrammatic Fig. 10 to show the fluid flow produced by the opening of these ports. Fluid pressure entering bore 12 passes through port 18 around neck portion 76. Because the piston has been displaced downwardly, Figs. 5 and 10, port 40 is opened in communication with port 18 whereupon fluid flows outwardly of port 40 and bore 38 to actuate the motor. Fluid returning from the motor in bore 34 passes through port 36 around neck portion 74, and outwardly of port 26 and bore 20 back to the pump. Fluid entering the longitudinal bore in the piston in this instance would not pass beyond neck portion 78 because it would be closed off by piston heads 70 and 72. Should the piston be moved upwardly rather than downwardly, a similar flow would take place with ports 18 and 36 placed in communication for the pressure flow of the fluid, while the return fluid would enter port 40, pass around neck portion 78 into opening 82 and through the bore within the piston to opening 80, around neck portion 74 and out bore 20.

It is thus apparent that the pistons in either legs 4 or 6 can be independently moved to operate their respective motors. If the control stick is moved diagonally so that both links are simultaneously moved, then both motors will be actuated. It is apparent from the movement of the links 94 and 94a that one piston can be moved in one direction, while the other piston is moved in the opposite direction, and vice versa so that substantially universal movement of the gun turret is possible.

At the bore of socket 100, the spring 124 provides some means of holding the stock upright and giving some sense of control "feel" while moving the stick against the compression of the spring. However, the sense of control given is not great enough, and because of the ease of moving the pistons an erratic over-control would exist were it not for the dashpot arrangement at the ends of the pistons. When the piston is moved downwardly, as in Fig. 5, piston head 140 moves downwardly and spring 148 is compressed. Displacement of piston head 140 causes fluid to be discharged from the cylinder portion 52 out through ports 166 and 180, through space 167 between cylinder portion 52 and the cylinder bore, and into cylinder portion 52 on the opposite side of piston head 140 through ports 166a and 180a. Fluid cannot be discharged outwardly through valves 160 and 160a because of the check valves 162. At the same time the downward movement of piston head 140 causes a suction to exist adjacent the valve 162 if insufficient fluid is in the dashpot, and the check valve 162 under this suction is opened thus admitting additional fluid if necessary from bores 44 and 30. Upon reverse movement of the piston oil is displaced out of ports 166a, 180a, between cylinder portion 52 and the cylinder back through ports 160 and 180 sucking in more fluid through check valve 162 if the fluid is low in volume. This dashpot arrangement in combination with the spring 148 gives a resistance to the movement of the control stick so that over-control is prevented. The back pressure given to the control stick by the dashpot increases as the piston travel increases thus increasing the sense of "feel" given the control stick. The degree of resistance desired can be regulated by adjusting valves 170 and 170a so that ports 180 are either opened for lessened control or tightened for greater control by opening or closing ports 180 or 180a by movement of needle valves 178 so that more or less fluid is discharged from one side of the piston to the other. When the control stick is released, dashpot springs 148 return the pistons to normal position as in Fig. 5, and all ports are closed thus stopping all motors.

It is thus apparent that the invention provides a means for individually or simultaneously actuating two motors from the same valve by the movement of a single control member such as a control stick. The degree of control is regulatable so that over-control is prevented, while at the same time positive control is assured. The structure is relatively simple and compact and satisfies all the objects of the invention.

Having now described a means by which the objects of the invention are obtained, I claim:

1. A control mechanism of the type described comprising two elongated valve housings, a control valve slidable longitudinally in each of said valve housings, a member cast integral with said housings and holding them at an angle so that their axes intersect, an enlarged chamber at said intersection having walls integral with the cast parts, an operating handle universally mounted in a wall of said chamber and having an operating member normally located at said intersection, each of said control valves having a link extending to cooperate with said member for movement thereby and means on each link whereby it remains stationary when the said member is moved only in line with the axis of the other valve.

2. A control mechanism of the type described comprising two elongated valve housings, a control valve slidable longitudinally in each of said valve housings, a gusset member cast integral with and between said housings and holding them so that their axes intersect at a right angle, an enlarged chamber at said intersection having walls integral with the cast parts, an operating handle universally mounted in a wall of said chamber and having an operating member normally located at said intersection, each of said control valves having a link extending to cooperate with said member for movement thereby, means on each link whereby it remains stationary when the said member is moved only in line with the axis of the other valve, said housings each having a plurality of ports therein for control by said valves and said gusset having manifolds connecting corresponding ones of said ports and providing for attachment of fluid conduits.

3. A control mechanism of the type described comprising two elongated valve housings, a control valve slidable longitudinally in each of said valve housings, a gusset member cast integral with and between said housings and holding them so that their axes intersect at a right angle, an enlarged chamber at said intersection having walls integral with the cast parts, an operating handle universally mounted in a wall of said chamber and having an operating member normally located at said intersection, each of said control valves having a link extending to cooperate with said member for movement thereby, means on each link whereby it remains stationary when the said member is moved only in line with the axis of the other valve, each of said housings having similarly located fluid inlet and discharge ports and motor ports, said gusset having cast manifolds for said inlet and outlet ports and pipe connections for the manifolds.

4. A control mechanism of the type described comprising two elongated valve housings, a control valve slidable longitudinally in each of said valve housings, a gusset member cast integral with and between said housings and holding them so that their axes intersect at a right angle, an enlarged chamber at said intersection having walls integral with the cast parts, an operating handle universally mounted in a wall of said chamber and having an operating member normally located at said intersection, each of said control valves having a link extending to cooperate with said member for movement thereby, means on each link whereby it remains stationary when the said member is moved only in line with the axis of the other valve, each of said housings having similarly located fluid inlet and discharge ports and motor ports, said gusset having cast manifolds for said inlet and outlet ports and pipe connections for the manifolds, said gusset also containing conduit from pipe connections to the valve motor ports.

5. A control mechanism of the type described comprising two elongated valve housings, a control valve slidable longitudinally in each of said valve housings, a gusset member cast integral with said housings and holding them so that their axes intersect at a right angle, an enlarged chamber at said intersection having walls integral with the cast parts, an operating handle universally mounted in a wall of said chamber and having an operating member normally located at said intersection, each of said control valves having a link extending to cooperate with said member for movement thereby, said housings having inlet and outlet ports therein for control by said valves, said gusset having manifolds therein connecting corresponding ones of said ports, each valve having a dashpot directly associated therewith and passages in said gusset for supplying said dashpots from one of the manifolds.

JOHN W. OVERBEKE.